(12) United States Patent
Osgood et al.

(10) Patent No.: US 10,981,217 B2
(45) Date of Patent: Apr. 20, 2021

(54) LEACHABLE CASTING CORE AND METHOD OF MANUFACTURE

(71) Applicant: General Electric Company, Schenectady, NY (US)

(72) Inventors: Daniel Endecott Osgood, Cincinnati, OH (US); Tingfan Pang, West Chester, OH (US); Gregory Terrence Garay, West Chester, OH (US); Zachary Daniel Webster, Mason, OH (US); Ryan Christopher Jones, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 122 days.

(21) Appl. No.: 16/195,089

(22) Filed: Nov. 19, 2018

(65) Prior Publication Data

US 2020/0156145 A1     May 21, 2020

(51) Int. Cl.
| | |
|---|---|
| B22C 9/10 | (2006.01) |
| B22C 9/12 | (2006.01) |
| B22C 9/26 | (2006.01) |
| B22C 7/02 | (2006.01) |
| B22C 21/14 | (2006.01) |

(Continued)

(52) U.S. Cl.
CPC ............... B22C 9/10 (2013.01); B22C 7/02 (2013.01); B22C 9/12 (2013.01); B22C 9/26 (2013.01); B22C 21/14 (2013.01); B28B 1/001 (2013.01); B28B 7/346 (2013.01); F01D 5/187 (2013.01); B33Y 10/00 (2014.12); B33Y 50/00 (2014.12); B33Y 80/00 (2014.12);

(Continued)

(58) Field of Classification Search
CPC .... B22C 9/10; B22C 9/12; B22C 9/26; B22C 9/00; B22C 9/103; B22C 9/22; B22C 7/00; B22C 7/02
See application file for complete search history.

(56) References Cited

U.S. PATENT DOCUMENTS

| | | | |
|---|---|---|---|
| 5,947,181 A * | 9/1999 | Davis ...................... | B22C 9/106 164/131 |
| 6,186,741 B1 | 2/2001 | Webb et al. | |

(Continued)

FOREIGN PATENT DOCUMENTS

| | | |
|---|---|---|
| CN | 1772419 A | 5/2006 |
| CN | 205085349 U | 3/2016 |

(Continued)

OTHER PUBLICATIONS

Chinese Patent Office, Office Action re Corresponding Application No. 201911065558.7, dated Dec. 11, 2020, 9 pages, China.

*Primary Examiner* — Kevin P Kerns
*Assistant Examiner* — Steven S Ha
(74) *Attorney, Agent, or Firm* — McGarry Bair PC

(57) ABSTRACT

A leachable casting core and method of manufacture may include a plurality of legs configured to establish a plurality of internal flow channels of a cast component. Tie bars, with a first tie bar end and a second tie bar end opposite thereof, may couple to at least two of the plurality of legs. At least one of the tie bars may be oriented to form a linking cavity within the cast component between the internal flow channels. The linking cavity may serve as an obstruction to fluid communication through the linking cavity.

12 Claims, 12 Drawing Sheets

(51) Int. Cl.
  *F01D 5/18* (2006.01)
  *B28B 7/34* (2006.01)
  *B28B 1/00* (2006.01)
  *B33Y 10/00* (2015.01)
  *B33Y 80/00* (2015.01)
  *B33Y 50/00* (2015.01)
(52) U.S. Cl.
  CPC .... *F05D 2220/323* (2013.01); *F05D 2230/21* (2013.01); *F05D 2230/31* (2013.01)

(56) References Cited

U.S. PATENT DOCUMENTS

| | | |
|---|---|---|
| 6,340,047 B1 | 1/2002 | Frey |
| 7,569,172 B2 | 8/2009 | Pietraszkiewicz et al. |
| 8,628,294 B1 | 1/2014 | Liang |
| 8,936,068 B2 | 1/2015 | Lee et al. |
| 9,121,291 B2 | 9/2015 | Hada |
| 9,216,451 B2 | 12/2015 | Lee et al. |
| 9,518,468 B2 | 12/2016 | Tibbott et al. |
| 10,695,825 B2 | 6/2020 | Todorov et al. |
| 2015/0322799 A1* | 11/2015 | Xu .................. B22D 25/02 416/231 R |
| 2016/0194965 A1 | 7/2016 | Spangler |
| 2018/0283183 A1* | 10/2018 | Gallier .................. F01D 25/12 |

FOREIGN PATENT DOCUMENTS

| | | |
|---|---|---|
| CN | 107848020 A | 3/2018 |
| EP | 3088100 A1 | 11/2016 |

* cited by examiner

LEACHABLE CASTING CORE AND METHOD OF MANUFACTURE

FIELD

The present subject matter relates generally to the production of components for gas turbine engines, and more particularly, to a leachable casting core and method of manufacturing.

BACKGROUND

A gas turbine engine generally includes, in serial flow order, a compressor section, a combustion section, a turbine section and an exhaust section. In operation, air enters an inlet of the compressor section where one or more axial or centrifugal compressors progressively compress the air until it reaches the combustion section. Fuel is mixed with the compressed air and burned within the combustion section to provide combustion gases. The combustion gases are routed from the combustion section through a hot gas path defined within the turbine section and then exhausted from the turbine section via the exhaust section.

In particular configurations, the turbine section includes, in serial flow order, a high pressure (HP) turbine and a low pressure (LP) turbine. The HP turbine and the LP turbine each include various rotatable turbine components such as turbine rotor blades, rotor disks and retainers, and various stationary turbine components such as stator vanes or nozzles, turbine shrouds, and engine frames. The rotatable and stationary turbine components at least partially define the hot gas path through the turbine section. As the combustion gases flow through the hot gas path, thermal energy is transferred from the combustion gases to the rotatable and stationary turbine components.

A typical gas turbine engine includes components having very fine cooling passages that allow for higher gas temperatures in the combustor and/or the HP or LP turbines. These cooling passages are generally formed during the casting process of the component. Casting is a common manufacturing technique for forming various components of a gas turbine aviation engine. Casting a component involves a mold having the negative of the desired component shape. If a particular internal shape is desired, a core is placed into the mold. Once the mold is prepared and any cores are positioned, molten material is introduced into the mold. After the material cools, the mold is removed, and the core may be leached from within the cast component exposing the internal shape.

To develop the cooling passages during casting, a casting core is produced with a plurality of legs. Without additional support, there is a high probability that the legs will shift from their intended positions during the casting process, which may result in the cooling passages collapsing onto to one another resulting in "cross talk" or "kiss out." In order to improve producibility, a certain number of tie bars are required to secure the legs in the desired position. These tie bars are typically made of the same material as the core. With the tie bars securing the legs, the core is secured in a mold and the component is cast. Once the casting is complete, the core is leached from the cast component exposing the desired cooling passages, but also generally exposing a plurality of linking cavities formed by the plurality of tie bars. These linking cavities allow the cooling fluid to depart from the designed cooling passages and are thus, undesirable.

As such, there is a need for an improved method for making cooling passages in components.

BRIEF DESCRIPTION

Aspects and advantages of the invention will be set forth in part in the following description, or may be obvious from the description, or may be learned through practice of the invention.

In accordance with one embodiment of the present disclosure, an additive manufactured, leachable casting core is provided. The leachable casting core may include a plurality of legs configured to establish a plurality of internal flow channels of a cast component. Tie bars, with a first tie bar end and a second tie bar end opposite thereof, may couple to at least two of the plurality of legs. At least one of the tie bars may be oriented to form a linking cavity within the cast component between the internal flow channels. The configuration of the linking cavity may serve as an obstruction to fluid communication through the linking cavity.

In accordance with another embodiment of the present disclosure, a method for manufacturing a leachable casting core is provided. The method may include depositing a layer of additive material on a bed of an additive manufacturing machine. Energy from an energy source may be selectively directed onto the layer of additive material to fuse a portion of the additive material and form the leachable casting core. The casting core may include a plurality of legs with an outer shape, which is a negative of at least a first flow channel and a second flow channel of a cast component. Tie bars, with a first tie bar end and a second tie bar end, may couple at least two of the plurality of legs. The tie bars may have a negative shape of an obstruction to fluid communication within a cast component.

In accordance with another embodiment of the present disclosure, computer-implemented method for designing leachable casting cores is provided. The method may include obtaining, by a computing system comprising one or more computing devices, data indicative of a first three-dimensional model of a leachable casting core. The casting core may include a plurality of legs. The plurality of legs may be oriented to form at least a first internal flow channel and a second internal flow channel within a cast component. The method may also include obtaining, by the computing system, data indicative of a quantity and coupling location information for a plurality of tie bars to secure an orientation of the plurality of legs. The plurality of tie bars may have a first tie bar end, a second tie bar end, and a negative shape of an obstruction to fluid communication within the cast component. The computing system may generate a second three-dimensional model based, at least, in part on the first three-dimensional model of a casting core and the quantity and coupling location information for the plurality of tie bars. The second three-dimensional model may be representative of the leachable casting core including the plurality of tie bars securing the orientation of the plurality of legs. The computing system may determine a plurality of slices based, at least in part, on the second three-dimensional model. Each slice of the plurality of slices may define a respective cross-sectional layer of the leachable casting core. The computing system may output data indicative of the plurality of slices to a memory.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
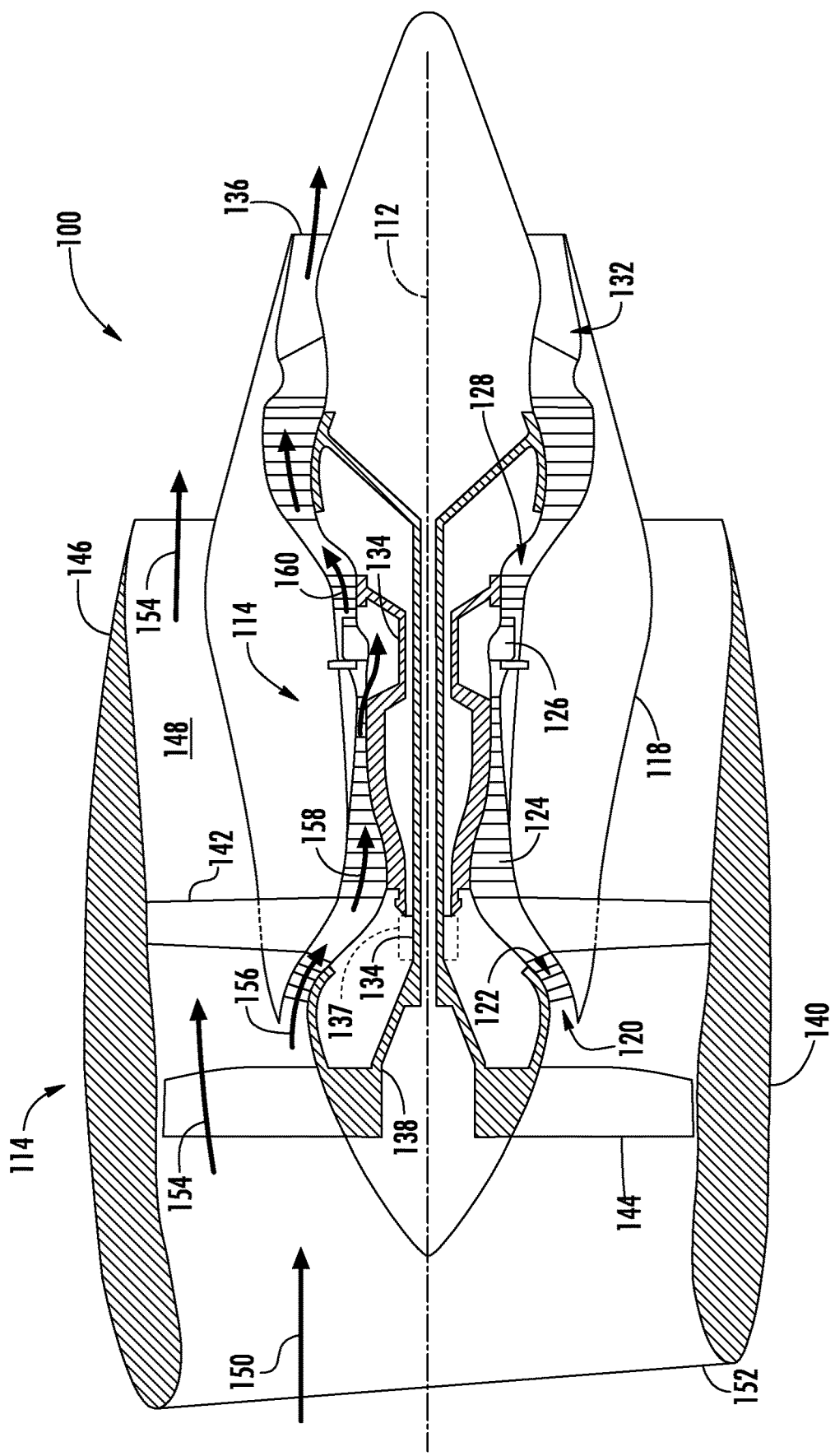
FIG. 1 illustrates a schematic cross-sectional view of one embodiment of a gas turbine engine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In general, the present subject matter is directed to cast components of gas turbine engines, and more particularly, to reduced cross flow linking cavities, a leachable casting core, and methods of manufacturing. In one embodiment, tie bars are generally presented that may obstruct fluid communication through the resultant linking cavities. These tie bars employ various aerodynamic and structural concepts to obstruct or resist fluid flow in the resulting linking cavities; including, shapes, low-pressure regions, pressure balancing, and physical obstruction.

Referring now to the drawings, FIG. 1 illustrates a cross-sectional view of one embodiment of a gas turbine engine 100 that may be utilized within an aircraft in accordance with aspects of the present subject matter, with the engine 100 being shown having a longitudinal or axial centerline axis 112 extending therethrough for reference purposes. Although shown as a turbofan engine, any suitable engine can be utilized with the described herein. For example, suitable engines include but are not limited to high-bypass turbofan engines, low-bypass turbofan engines, turbojet engines, turboprop engines, turboshaft engines, propfan engines, and so forth. The engine 100 will be discussed in detail below.

Figure 2:
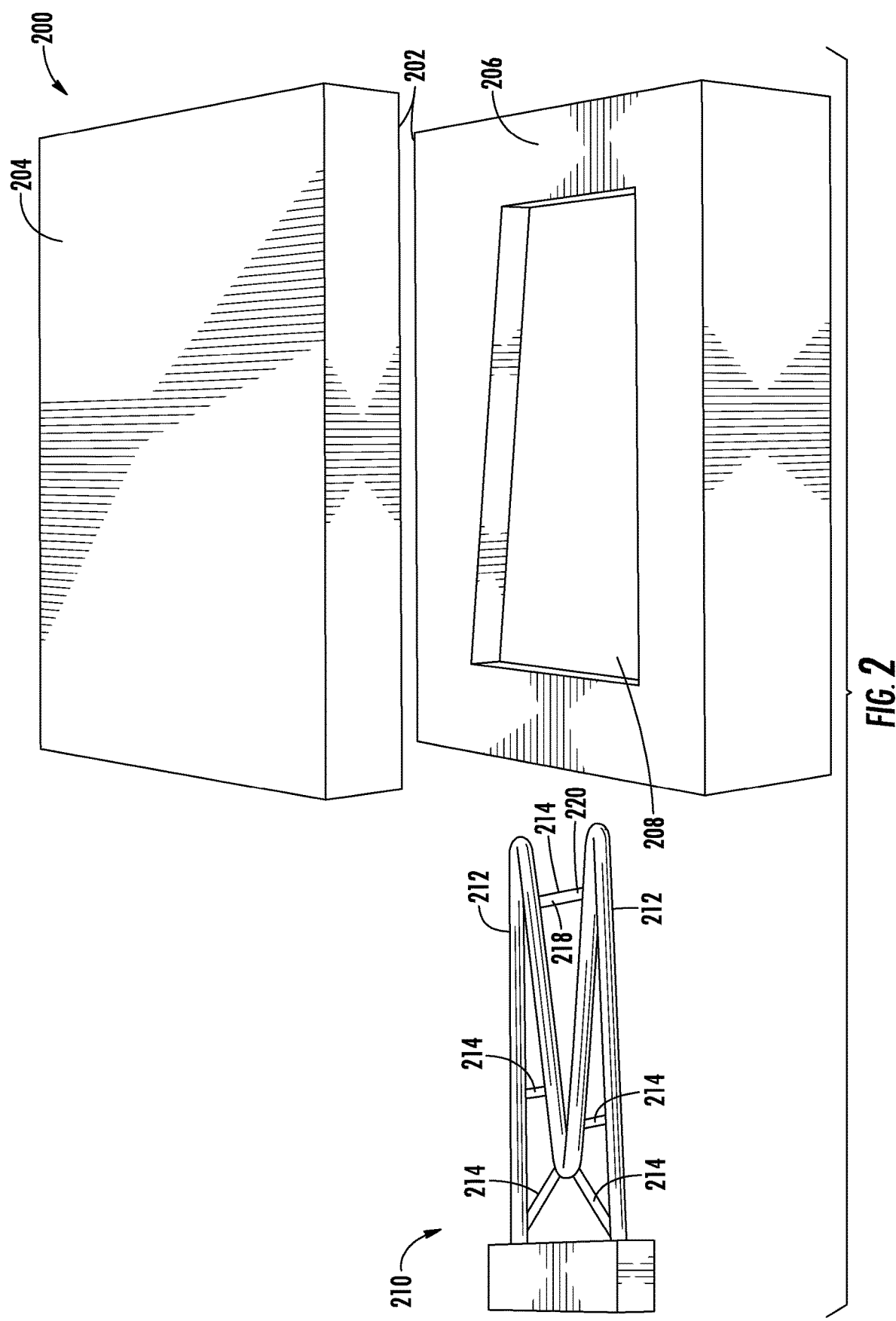
FIG. 2 illustrates a perspective projection of one embodiment of a plurality of casting tools for casting a component having a plurality of internal flow channels in accordance with aspects of the present subject matter.

FIG. 2 illustrates a perspective projection of one embodiment of a plurality of casting tools 200 for casting a component having a plurality of internal flow channels in accordance with aspects of the present subject matter. As illustrated, the plurality of casting tools 200 includes, in several embodiments, a mold 202 comprising a mold first half 204 and a mold second half 206. The mold first half 202 and the mold second half 206 are formed with a component outer shape negative 208. The component outer shape negative 208 establishes the component outer shape (FIG. 3a, 326) of the cast component (FIG. 3a, 300) when a molten material is introduced into the mold 202. The mold may be formed from any suitable material, such as metal, ceramic, or sand, including silica, olivine, chromate, zircon, and sodium silicate. It should be appreciated that while an embodiment is depicted in FIG. 2 as having at least two halves, other singular molds, such as those employed in investment casting, and molds with more than two components are also in accordance with aspects of the present subject matter.

Referring still to FIG. 2, in instances where a specific internal shape is desired, a leachable casting core (hereinafter referred to as a "core") 210 is secured in the mold 202 prior to the introduction of a molten material. The core 210 defines a component inner shape of the resulting cast component and, in certain embodiments, is leached from the cast component (FIG. 3b, 300) after casting. It should be appreciated that the core 210 may be produced by any recognized manufacturing method, including additive manufacturing methods, such as described in more detail below.

The leaching of the core 210 may be accomplished by any suitable leaching process. The process may be selected based on the composition of the core 210, the composition of the cast component, and the core geometry. For example, a chemical leaching mechanism may be used to remove a ceramic core. Such an exemplary leaching process may include placing the casting in an autoclave and immersing the casting in an alkaline solution (e.g., aqueous or alcoholic sodium hydroxide or potassium hydroxide). The solution exposure may be at an elevated pressure (e.g., from 1 MPa to 5 MPa) and a moderately elevated temperature (e.g., from 150° C. to 400° C.). The pressure and/or temperature may be cycled, and the solution may be agitated to maintain exposure of the alkaline solution to the ceramic core and evacuate reaction products.

Referring still to FIG. 2, in the depicted embodiment, the core 210 is shown having a plurality of legs 212. The plurality of legs 212 have a serpentine shape such that, upon leaching, a plurality of internal flow channels 302, 304 with a serpentine shape are produced within the cast component 300. In the depicted embodiment, the plurality of internal flow channels 302, 304 form a serpentine flow channel in the cast component 300. The plurality of legs 212 are held in place during casting by a plurality of tie bars 214. The tie bars 214 have a first tie bar end 218 and a second tie bar end 220. As with the other components of the core, following casting, the tie bars 214 are generally leached from the cast component 300, exposing a plurality of linking cavities (FIG. 3b, 306). The tie bars 214 are configured so that when leached, the resultant linking cavities intentionally reduce or increase a pressure differential over a traditional 90° straight tie bar, depending on design considerations. For example, the tie bars 214 may include obstructions or may take advantage of static, dynamic, and total pressure as design levers. Flow changes of a particular embodiment, in comparison to an unobstructed flow through the 90° straight tie bar, are within a range of 0% to 50% (e.g., 10% to 30%) flow reduction from the flow through the 90° straight tie bar.

Figure 3A:
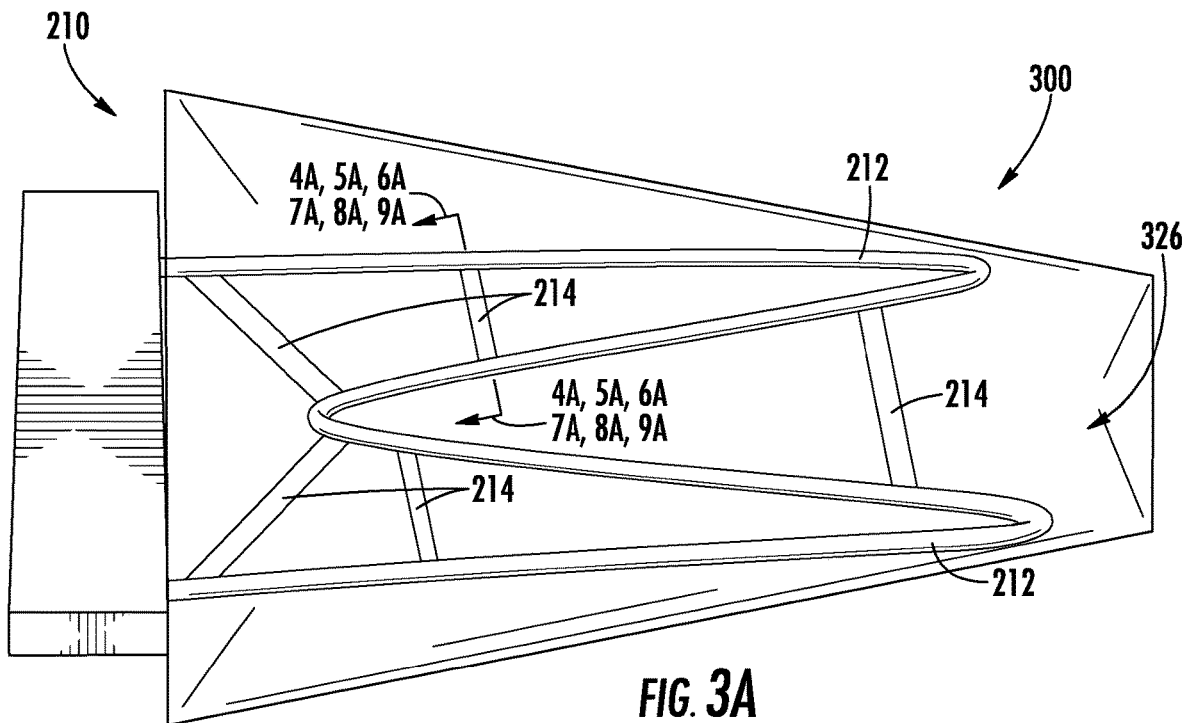
FIG. 3a illustrates a perspective projection of one embodiment of an intermediate cast component of a gas turbine aviation engine in accordance with aspects of the present subject matter.
Figure 3B:
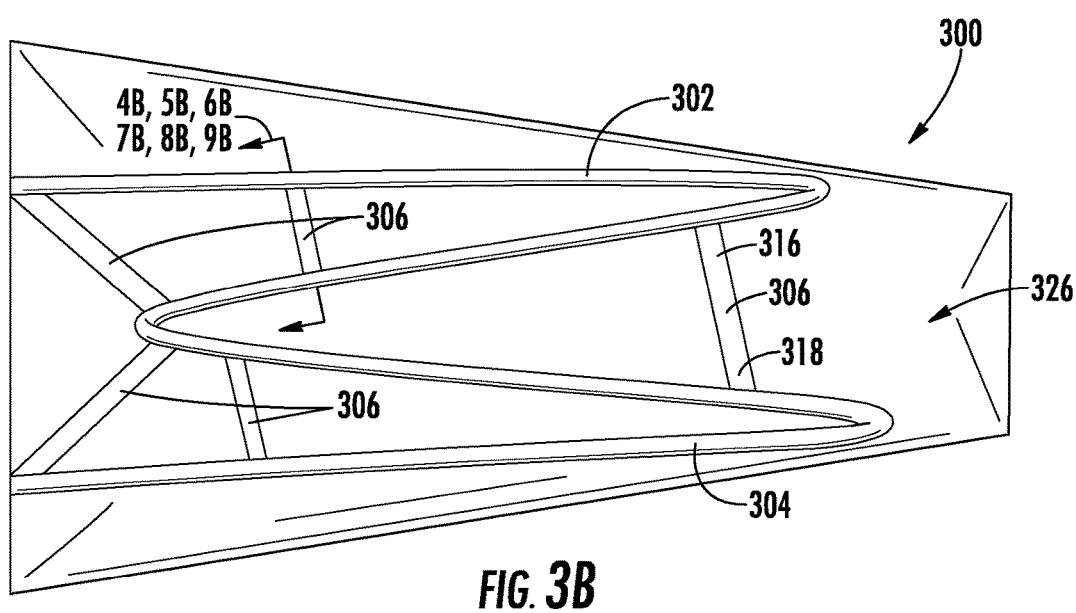
FIG. 3b illustrates a perspective projection of one embodiment of a cast component in accordance with aspects of the present subject matter.

FIG. 3a illustrates a perspective projection of one embodiment of an intermediate cast component of a gas turbine aviation engine in accordance with aspects of the present subject matter. As illustrated, the cast component 300 has an outer shape 326 formed via casting the component in a mold 202, and the cast component 300 has been removed from the mold 202. The cast component 300 includes the core 210 within the cast component 300. The cast component 300 comprises a first material, and the core 210 comprises a second material that is susceptible to leaching. The core 210 includes a plurality of legs 212 fixed in place by a plurality of tie bars 214.

FIG. 3b illustrates a perspective projection of the embodiment of FIG. 3a after leaching of the core 210. As illustrated, the cast component 300 has an outer shape 326 formed via casting the component in a mold 202. The cast component 300 includes a plurality of internal flow channels 302, 304 and linking cavities 306 therebetween. The plurality of internal flow channels 302, 304 and linking cavities 306 are defined by the core 210. The leaching of the core 210 enables a fluid flow within the plurality of internal flow channels 302, 304 and linking cavities 306. It should be appreciated that the plurality of internal flow channels 302, 304 may be configured in any desirable configuration, including as a serpentine cooling passage. It should be appreciated that in some embodiments, the cast component 300 may be a component of a gas turbine aviation engine with internal fluid cooling channels. For example, the cast component 300 may be a vane, a blade, a shroud, strut, or a blade platform as described in FIG. 1.

Figure 4A:
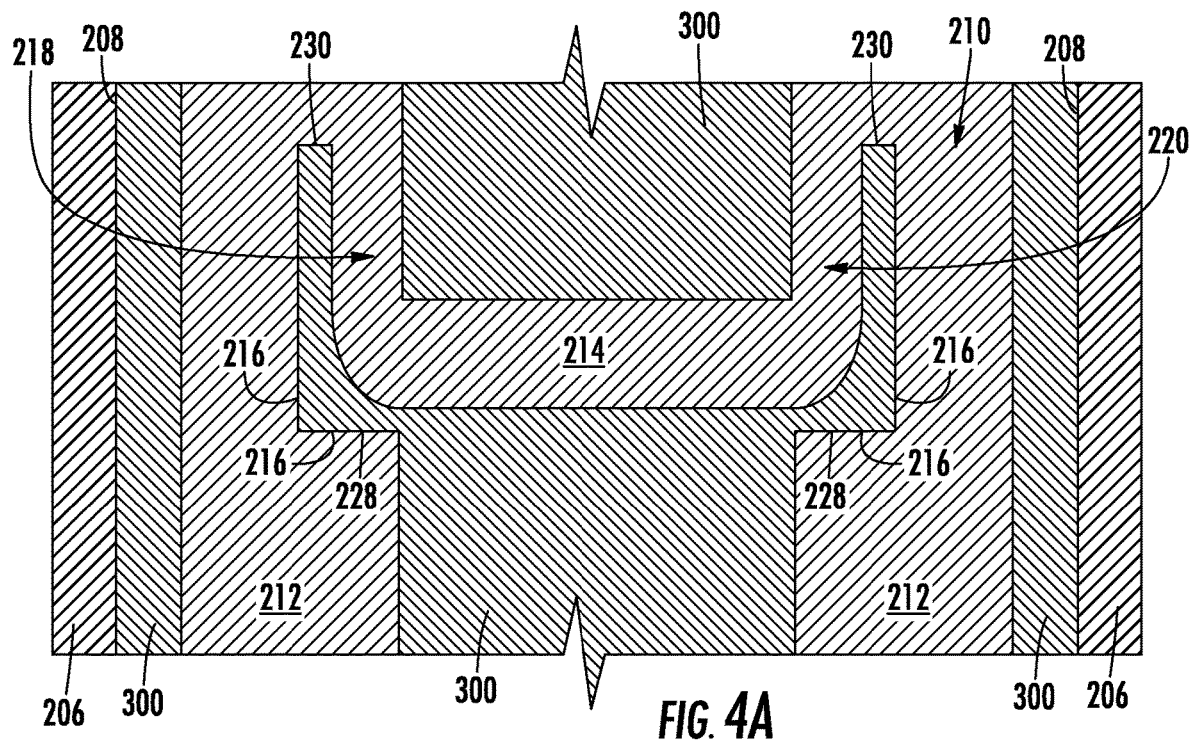
FIG. 4a depicts a cross section of the casting of a cast component and the core having a plurality of turbulators in accordance with aspects of the present subject matter.

FIG. 4a depicts a cross section of a cast component 300 surrounding a portion of the core 210 held in a mold second half 206 after casting, but prior to leaching, in accordance with aspects of the present subject matter. As illustrated in FIG. 4a, the plurality of legs 212 include a plurality of turbulator forms 216. The plurality of turbulator forms 216 having an upstream face 228 and a downstream face 230 opposite the upstream face 228. The first tie bar end 218 is in contact with a first flow channel downstream turbulator face 230 and the second tie bar end 220 is in contact with a second flow channel downstream turbulator face 230.

Figure 4B:
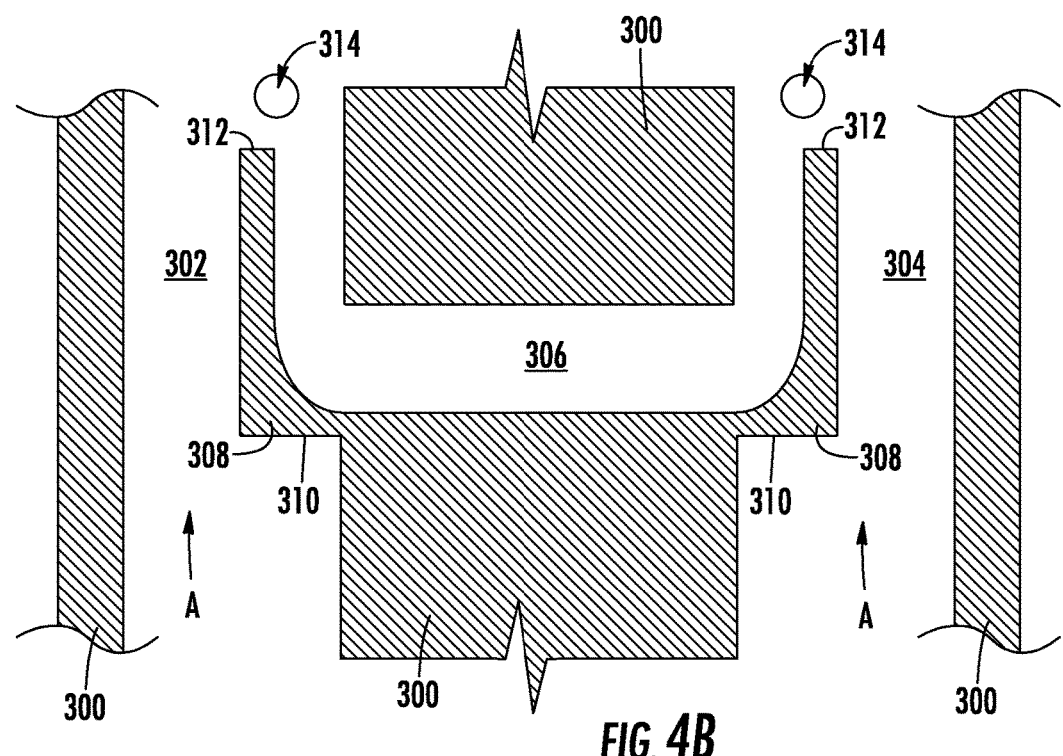
FIG. 4b depicts a cross section of an embodiment of a cast component having a plurality of turbulators in accordance with aspects of the present subject matter.

FIG. 4b depicts a cross section of the cast component 300 for FIG. 4a following the leaching of the core 210 and removal from the mold second half 206 in accordance with aspects of the present subject matter. As illustrated in FIG. 4b, the plurality of turbulator forms 216 of the core 210 (now leached out) establish a plurality of turbulators 308 within the plurality of internal flow channels 302 and 304. The plurality of turbulators 308 have an upstream face 310 and a downstream face 312 opposite the upstream face 310. As the fluid flow proceeds in the direction indicated by arrow (A), the downstream face 312 defines the leading edge of a low-pressure region 314. The plurality of linking cavities 306, exposed by the leaching of the plurality of tie bars 214, are established in fluid communication with the low-pressure regions 314. The fluid communication of the linking cavities 306 with the low-pressure regions 314 serves to obstruct fluid communication through the linking cavities.

Figure 5A:
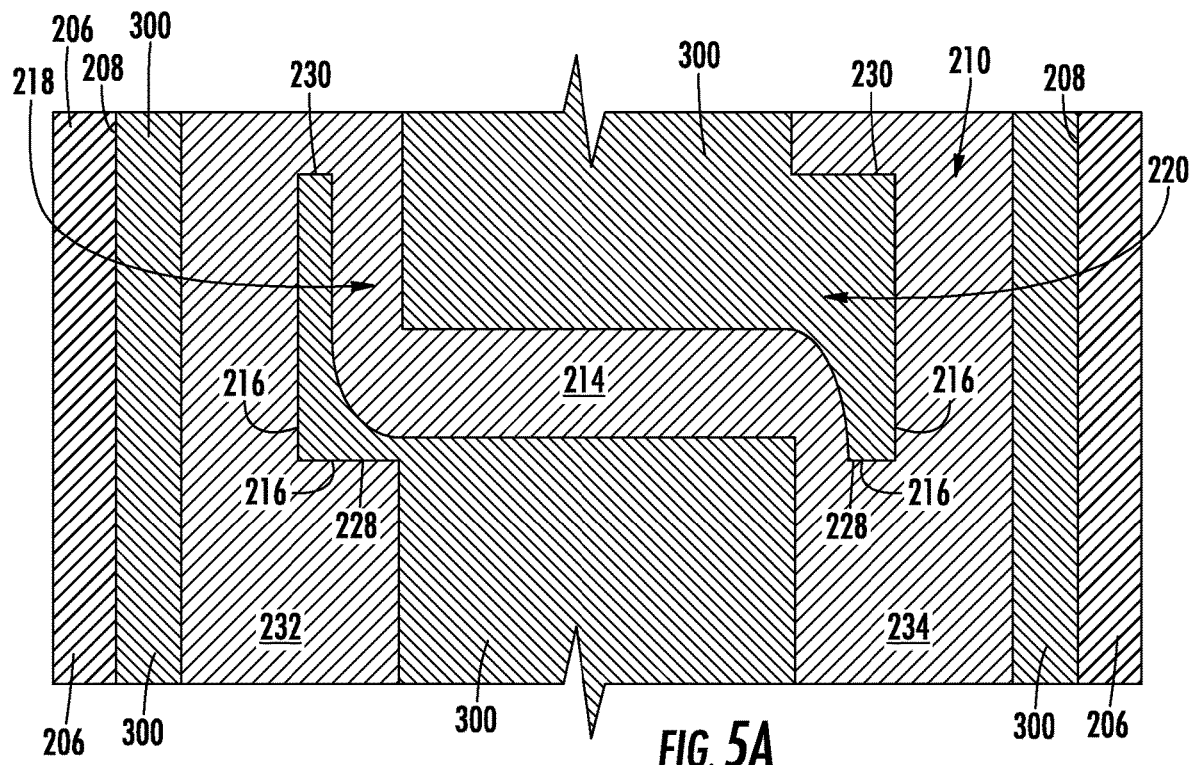
FIG. 5a depicts a cross section another embodiment of the casting of a cast component and the core having a plurality of turbulators in accordance with aspects of the present subject matter.

FIG. 5a depicts a cross section of the casting of a further exemplary cast component 300 surrounding a portion of the core 210 held in a mold second half 206 after casting, but prior to leaching, in accordance with aspects of the present subject matter. As illustrated in FIG. 5a, the plurality of legs 212 include a plurality of turbulator forms 216. The plurality of turbulator forms 216 have an upstream face 228 and a downstream face 230 opposite the upstream face 310. The first tie bar end 218 is coupled in contact with the downstream face 230 on a first leg 232, while the second tie bar end 220 is coupled with the upstream face 228 on a second leg 234.

Figure 5B:
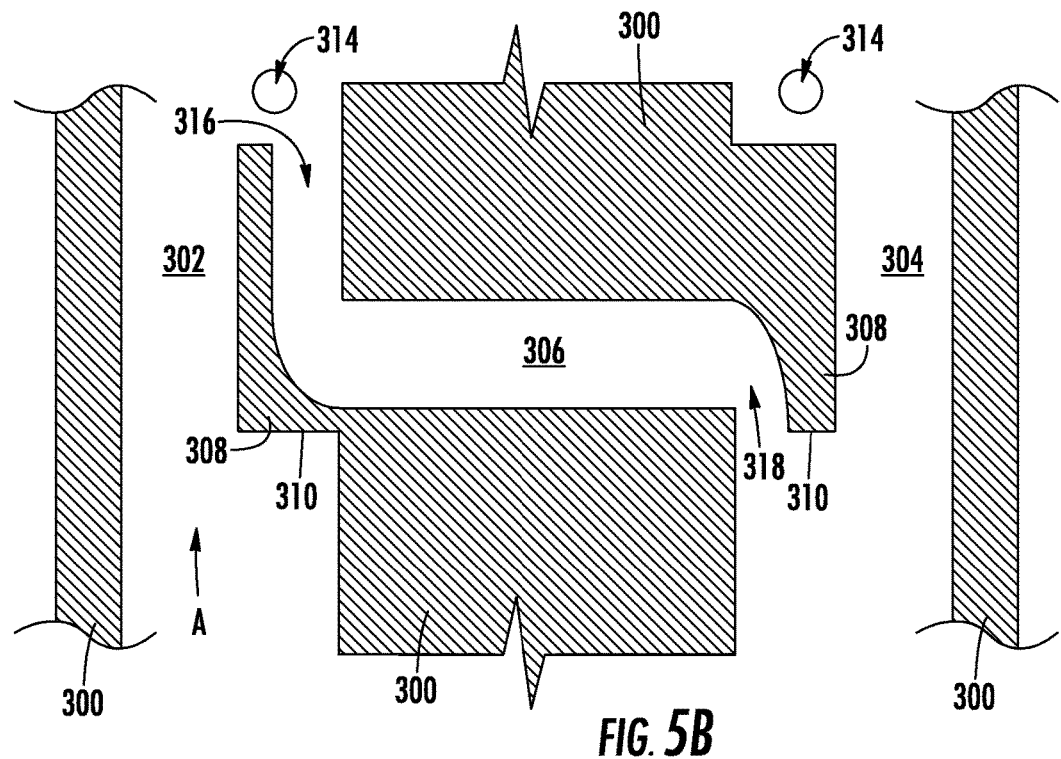
FIG. 5b depicts a cross section of another embodiment of a cast component having a plurality of turbulators in accordance with aspects of the present subject matter.

FIG. 5b depicts a cross section of the cast component 300 of FIG. 5a following the leaching of the core 210 and removal from the mold second half 206 in accordance with aspects of the present subject matter. As illustrated in FIG. 5b, a first flow channel 302 retains a first fluid flow having a first flow pressure. A second flow channel 304 retains a second fluid flow having a second flow pressure. In use with the first and second flow pressures, the first fluid flow pressure is greater than the second fluid flow pressure. During casting, the plurality of turbulator forms 216 established a plurality of turbulators 308 within the first flow channel 302 and the second flow channel 304. The plurality of turbulators 308 have an upstream face 310 and a downstream face 312 opposite the upstream face 310. As the fluid flow proceeds in the direction indicated by arrow (A), the downstream face 312 defines the leading edge of a low-pressure region 314. A linking cavity first end 316, exposed by the leaching of the plurality of tie bars 214, is established in fluid communication with the low-pressure region 314 of the first fluid flow channel 302. A linking cavity second end 318 is in fluid communication with the upstream turbulator face 310 of the second fluid flow channel 304. By configuring the linking cavity second end 318 in fluid communication with the upstream turbulator face 310, a portion of the second fluid flow is directed into the linking cavity 306. Since the second fluid flow pressure is less than the first fluid flow pressure, directing a portion of the second fluid flow into the linking cavity 306 while the linking cavity first end is in fluid communication with the low-pressure region 314 of the first fluid flow channel 302 results in a balancing of the pressure differential between the first fluid flow channel 302 and the second fluid flow channel 304. With the pressure differential reduced or eliminated, the linking cavity 306 is an obstruction to fluid communication between the first fluid flow channel 302 and the second fluid flow channel 304.

Figure 6A:
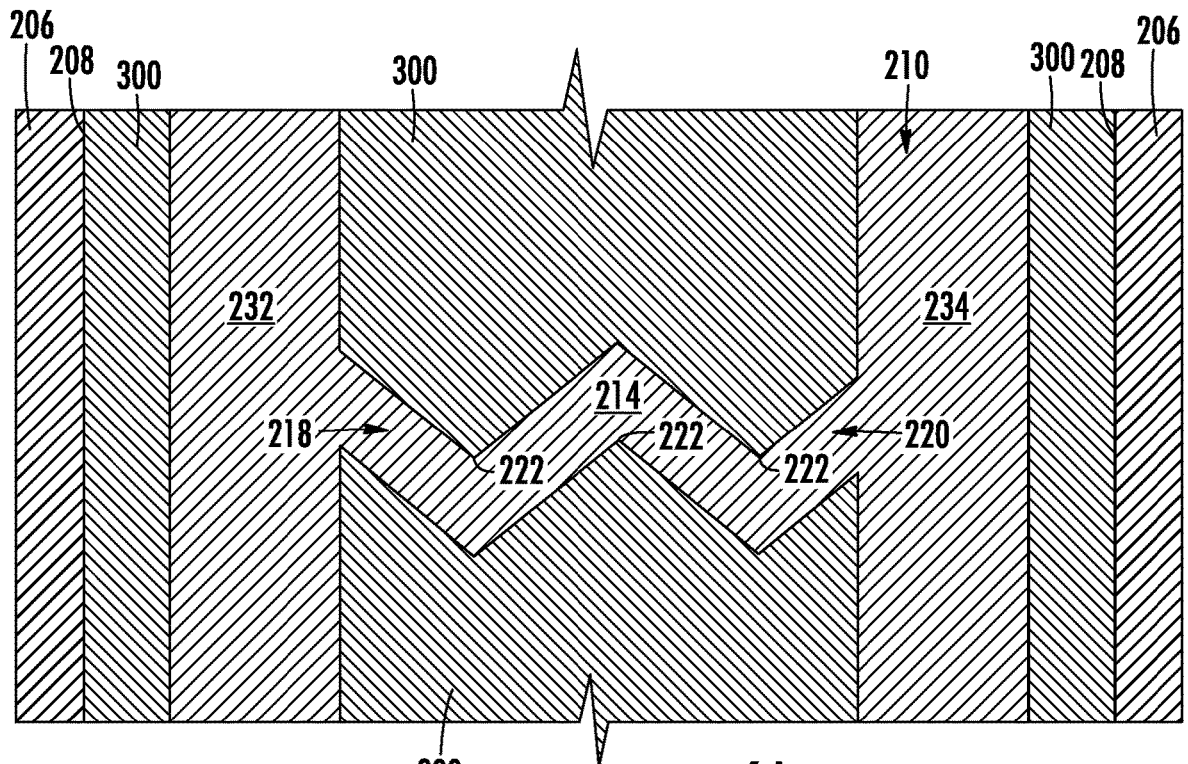
FIG. 6a depicts a cross section of an embodiment of a cast component and leachable casting core having tie bars with a plurality of bends in accordance with aspects of the present subject matter.

FIG. 6a depicts a cross section of the casting of a cast component 300 surrounding a portion of the core 210 held in a mold second half 206 after casting, but prior to leaching, in accordance with aspects of the present subject matter As illustrated in FIG. 6a, in certain embodiments, the first tie bar end 218 is coupled to the first leg 232 at an acute angle with respect to the first leg 232 and the second tie bar end 220 is coupled to the second leg 234 at an acute angle with respect to the second leg 234. It should be appreciated that the angle of intersections need not be the same and may be any angle other than perpendicular, such as 10° to 80° (e.g. 15° to 45°). The tie bar 214 is formed with a bend 222. In FIG. 6a, a plurality of bends 222 position the tie bar 214 in a "W" configuration, but it should be appreciated that any configuration with a bend 222 is acceptable along with any number of bends 222. For example, the tie bar 214 may have a "U" shape or an "S" shape. In some additional embodiments, the bends 222 may be asymmetrical both in amplitude and in distribution along the tie bar 214. In still further embodiments in accordance with aspects of the present subject matter, the angle of intersection may be perpendicular, and the tie bar 214 may be formed with a bend 222.

Figure 6B:
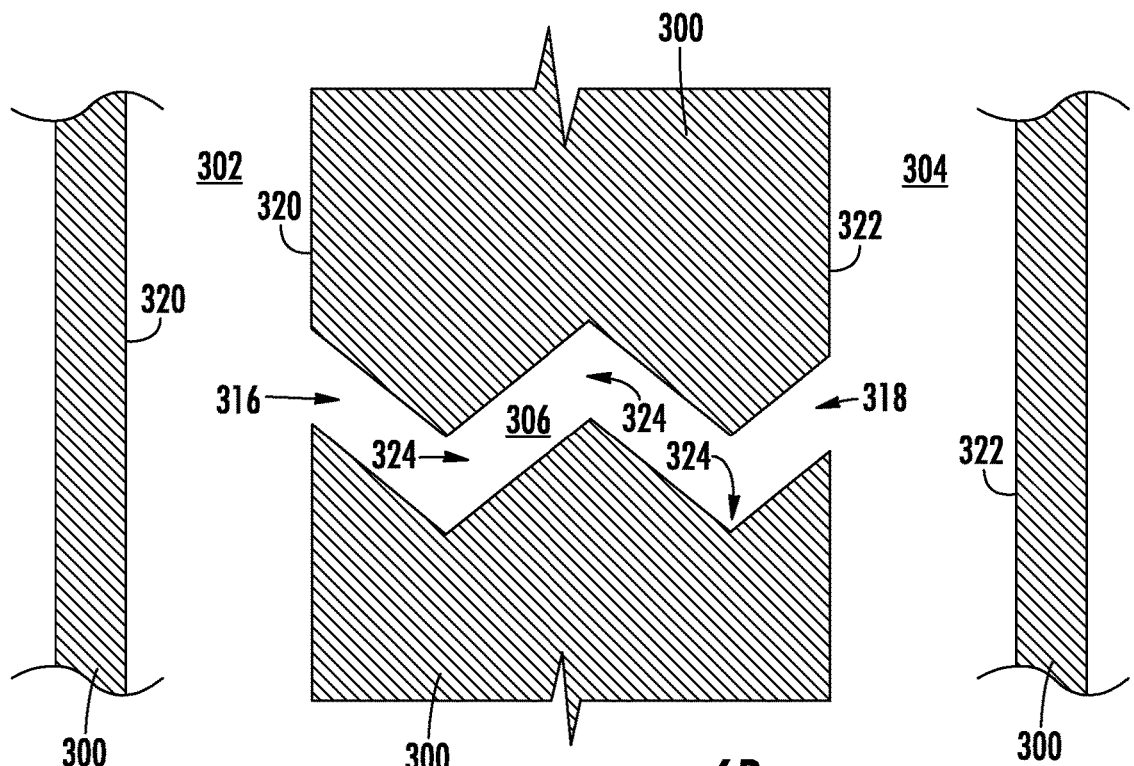
FIG. 6b depicts a cross section of an embodiment of a cast component having linking cavities with a plurality of bends in accordance with aspects of the present subject matter.

FIG. 6b depicts a cross section of the cast component 300 of FIG. 6a following the leaching of the core 210 and removal from the mold second half 206 in accordance with aspects of the present subject matter. As illustrated in FIG. 6b, the first internal flow channel 302 has a first channel outer surface 320, and the second internal flow channel 304 has a second channel outer surface 322. A linking cavity first end 316 intersects the first channel outer surface 320 at an acute angle with respect to the first channel outer surface 320. A linking cavity second end 318 intersects the second channel outer surface 322 at an acute angle with respect to the second channel outer surface 322. It should be appreciated that the angle of intersections need not be the same and may be any angle other than perpendicular such as 10° to 80° (e.g. 15° to 45°). As the form of the linking cavity 306 is dictated by the form of the tie bar 214, the leaching of the tie bar 214 having a bend 222 results in the linking cavity 306 having a bend 324. In FIG. 6b, a plurality of bends 324 position the linking cavity 306 in a "W" configuration with three bends, but it should be appreciated that any configuration with bends 324 is acceptable. For example, just as with the tie bar 214, the linking cavity 306 may have a "U" shape formed with one or three bends 324, or an "S" shape formed with two bends 324. In some additional embodiments, the plurality of bends 324 may be asymmetrical both in amplitude and in distribution along the linking cavity 306. The bend 324 dictates a fluid change of direction, which increases the resistance to be overcome by a transiting fluid. Thus, the bend 324 in the linking cavity 306 creates a configuration which obstructs fluid communication through the linking cavity 306. It should be appreciated that certain bend arrangements may also serve to counter Coriolis and centrifugal forces acting upon the cooling fluid in certain cast component 300 of a gas turbine aviation engine. It should also be appreciated that in still further embodiments in accordance with aspects of the present subject matter, the angle of intersection may be perpendicular, and the linking cavity 306 may be formed with a bend 324.

Figure 7A:
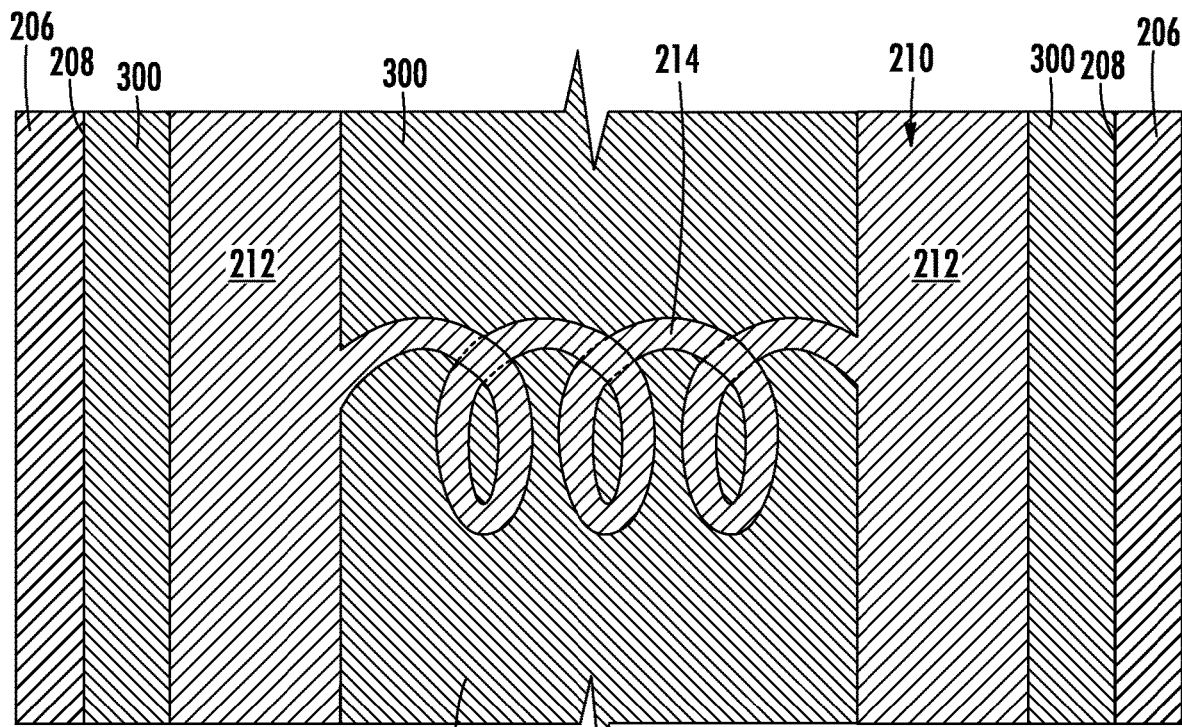
FIG. 7a depicts a cross section of an embodiment of a cast component and leachable casting core having a tie bar formed as a coil in accordance with aspects of the present subject matter.

FIG. 7a depicts a cross section of the casting of a cast component 300 surrounding a portion of the core 210 held in a mold second half 206 after casting, but prior to leaching, in accordance with aspects of the present subject matter. As illustrated in FIG. 7a, in certain embodiments, the tie bar 214 is a coil. It should be appreciated that additive manufacturing processes are particularly well suited to produce a core 210, particularly when the plurality of legs 212 and the plurality of tie bars 214 are produced from the same material and when at least one tie bar of the plurality of tie bars 214 is configured as a coil.

Figure 7B:
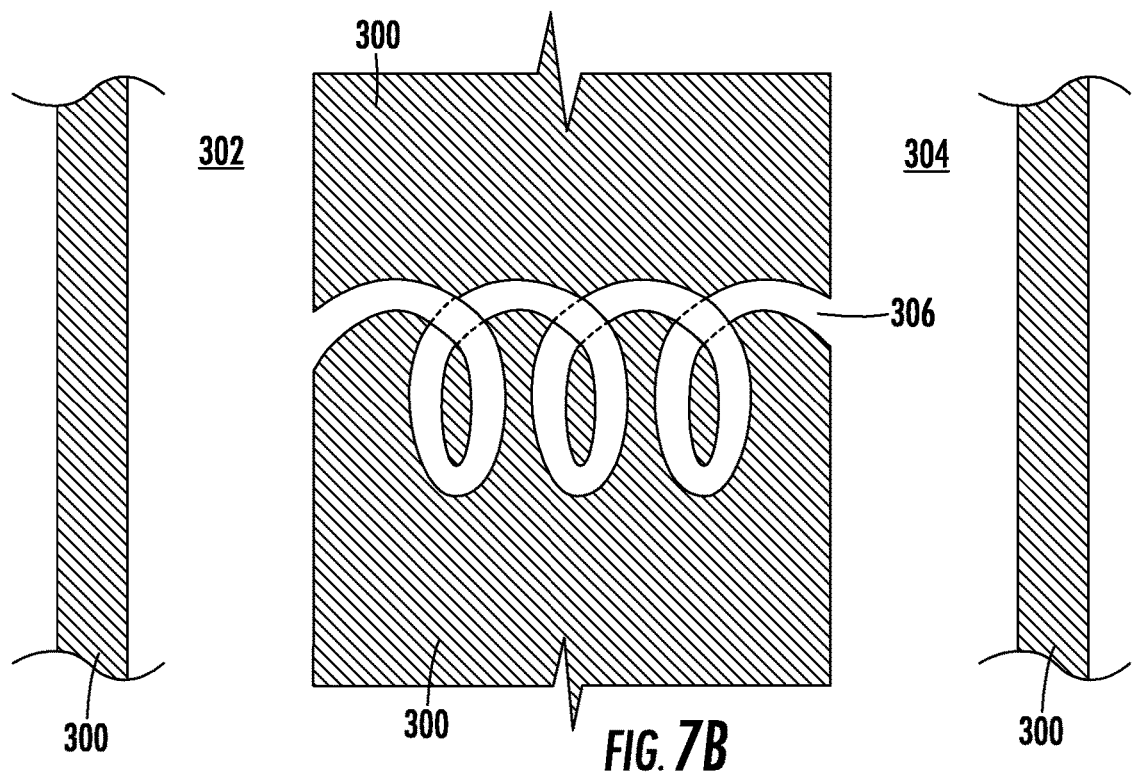
FIG. 7b depicts a cross section of an embodiment of a cast component having a linking cavity formed as a coil in accordance with aspects of the present subject matter.

FIG. 7b depicts a cross section of the cast component 300 for FIG. 7a following the leaching of the core 210 and removal from the mold second half 206 in accordance with aspects of the present subject matter. FIG. 7b illustrates an exemplary embodiment wherein the resultant linking cavity 306 is a hollow coil. With a coil configuration, the linking cavity 306 has a greater surface area than would be present in a straight tie bar spanning the linear distance between two legs 212. This increase in resistance obstructs fluid communication through the linking cavity 306. Additionally, a coil configuration may be oriented to counter Coriolis and centrifugal forces acting upon the cooling fluid in certain cast components 300 of a gas turbine aviation engine.

Figure 8A:
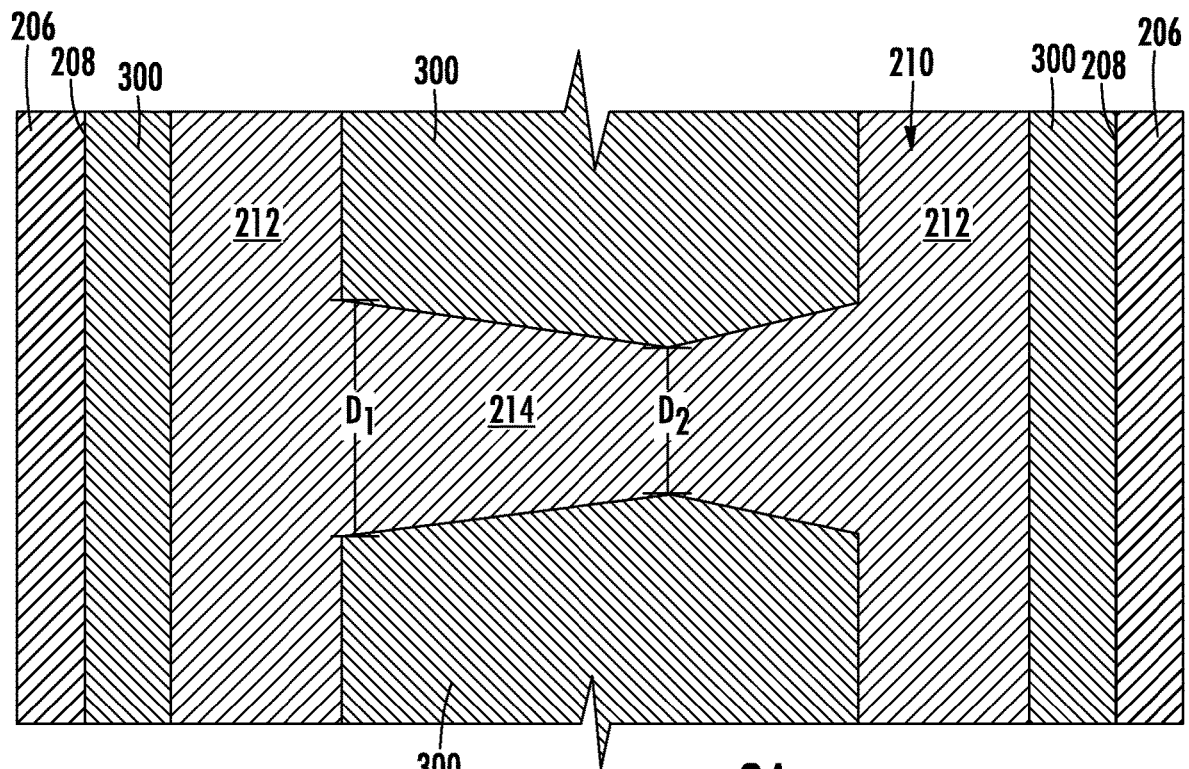
FIG. 8a depicts a cross section of an embodiment of a cast component and leachable casting core having a tie bar configured to form a Venturi tube in accordance with aspects of the present subject matter.

FIG. 8a depicts a cross section of the casting of a cast component 300 surrounding a portion of the core 210 held in a mold second half 206 after casting, but prior to leaching, in accordance with aspects of the present subject matter. As illustrated in FIG. 8a, in an alternative embodiment, a tie bar 214 may be configured to establish a Venturi tube (i.e., a convergent-divergent tube section). When configured to establish a Venturi tube, the tie bar 214 has a first diameter D1 and a second diameter D2. The first diameter D1 is located in contact with the first tie bar end and the second diameter D2 is located between the located between the first diameter D1 and the second tie bar end 318. The first diameter D1 is greater than the second diameter D2. The second diameter D2 creates a restriction section or "choke" within the resultant linking cavity 306. The second diameter D2 is established at a location calculated to establish such a restriction as is required to obstruct fluid communication through the resultant linking cavity 306.

Figure 8B:
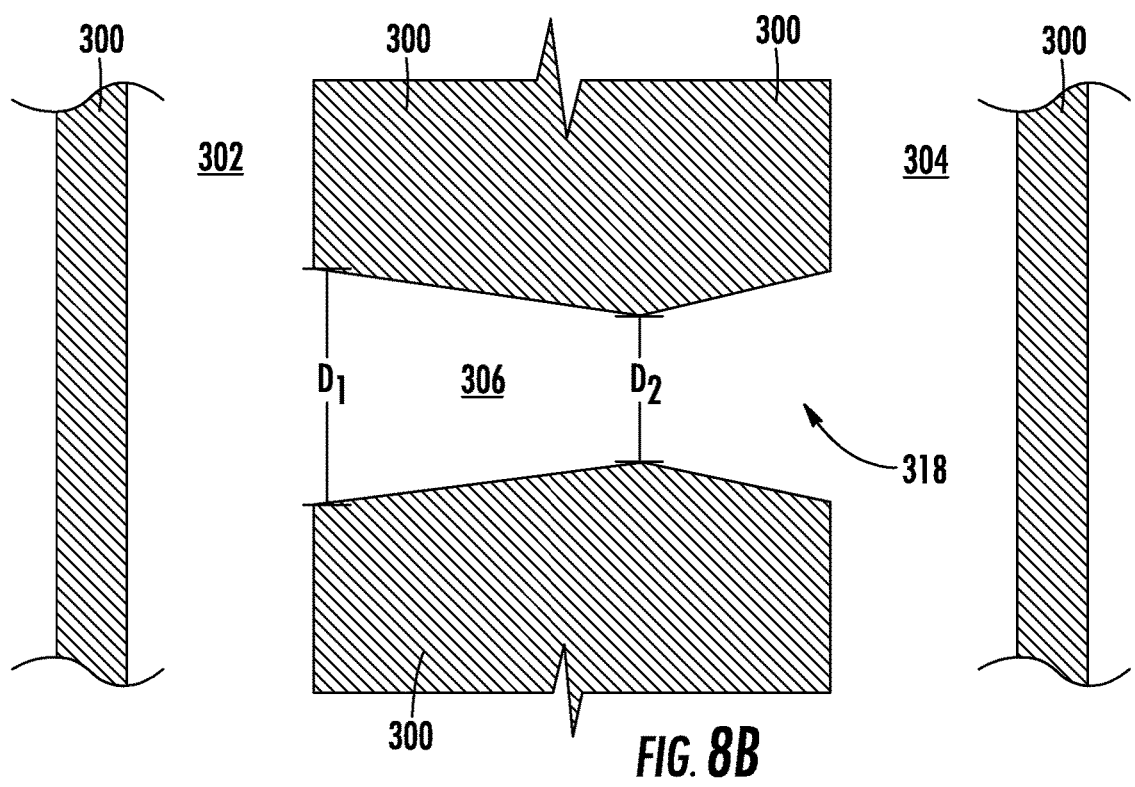
FIG. 8b depicts a cross section of an embodiment of a cast component having a linking cavity configured as a Venturi tube in accordance with aspects of the present subject matter.

FIG. 8b depicts a cross section of the cast component 300 for FIG. 8a following the leaching of the core 210 and removal from the mold second half 206 in accordance with aspects of the present subject matter. As illustrated in FIG. 8b, in an alternative embodiment, the linking cavity 306 may be configured as a Venturi tube. When configured as a Venturi tube, the linking cavity has a first diameter D1 and a second diameter D2. The first diameter D1 is greater than the second diameter D2. The second diameter D2 creates a restriction section or "choke" within the linking cavity 306. As fluid flows from the first diameter D1 toward the second diameter D2, the fluid's velocity increases while its static pressure decreases. As such, it is possible to locate the second diameter D2 at a location along the linking cavity 306 at which a pressure in the linking cavity first end 316 is equalized with a pressure in the linking cavity second end 318. It should be appreciated that the lack of a pressure differential between the linking cavity ends 316, 318 obstructs fluid communication through the linking cavity.

Figure 9A:
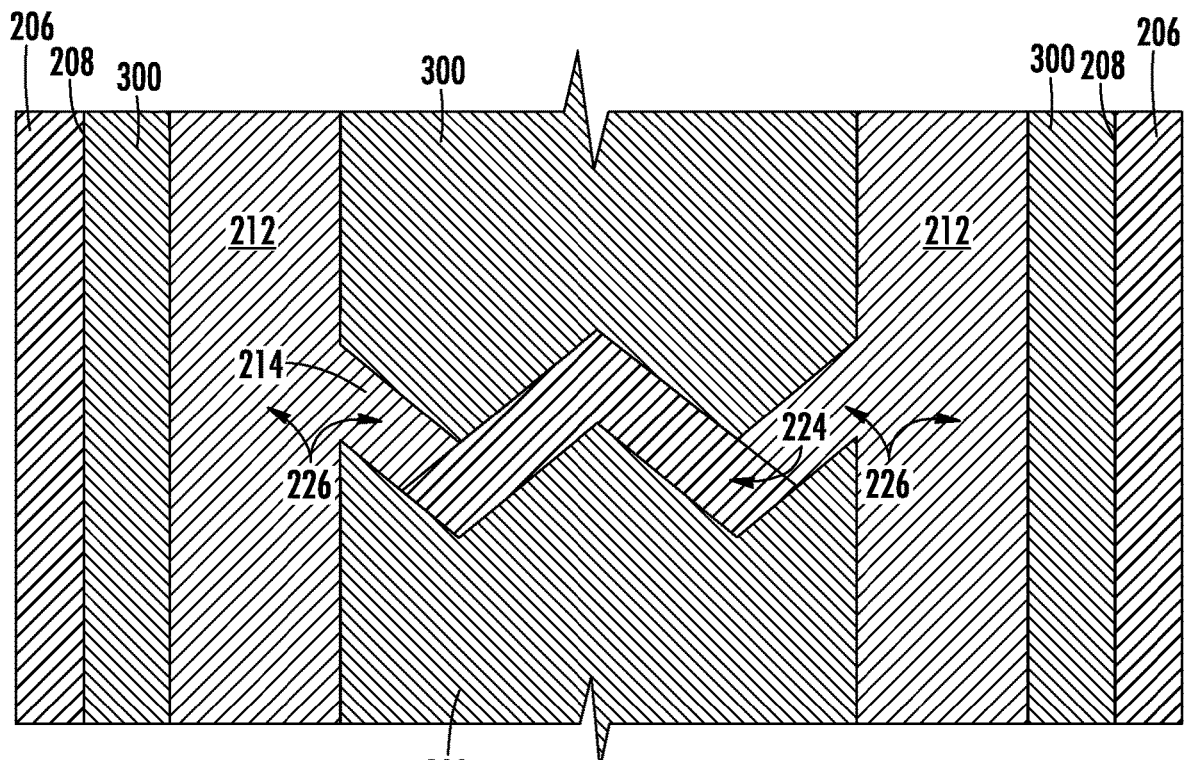
FIG. 9a depicts a cross section of an embodiment of a cast component and leachable casting core having a portion of a tie bar which is non-leachable in accordance with aspects of the present subject matter.

FIG. 9a depicts a cross section of a cast component 300 surrounding a portion of the core 210 held in a mold second half 206 after casting, but prior to leaching, in accordance with aspects of the present subject matter. As illustrated in FIG. 9a, in an alternative embodiment, the leachable casting core 210 comprises a first material 226 which is vulnerable to leaching, while the tie bar 214 comprises a second core material portion 224. The second core material portion 224 is resistant to the leaching process employed to remove a first leachable core material 226 from the cast component 300. For example, in certain embodiments, the core 210 may be additively manufactured such that the first core material 226 is a ceramic and the second core material portion 224 is a metal. Alternatively, the first core material 226 may be a metal, while the second core material portion 224 is a ceramic. In some embodiments, the second non-leachable core material portion 224 may be a portion of the same material of which the cast component 300 is comprised. Since the second non-leachable core material portion 224 is not removed from the cast component 300 by leaching, the second non-leachable core material portion 224 is an obstruction to fluid communication through the resultant linking cavity 306.

Figure 9B:
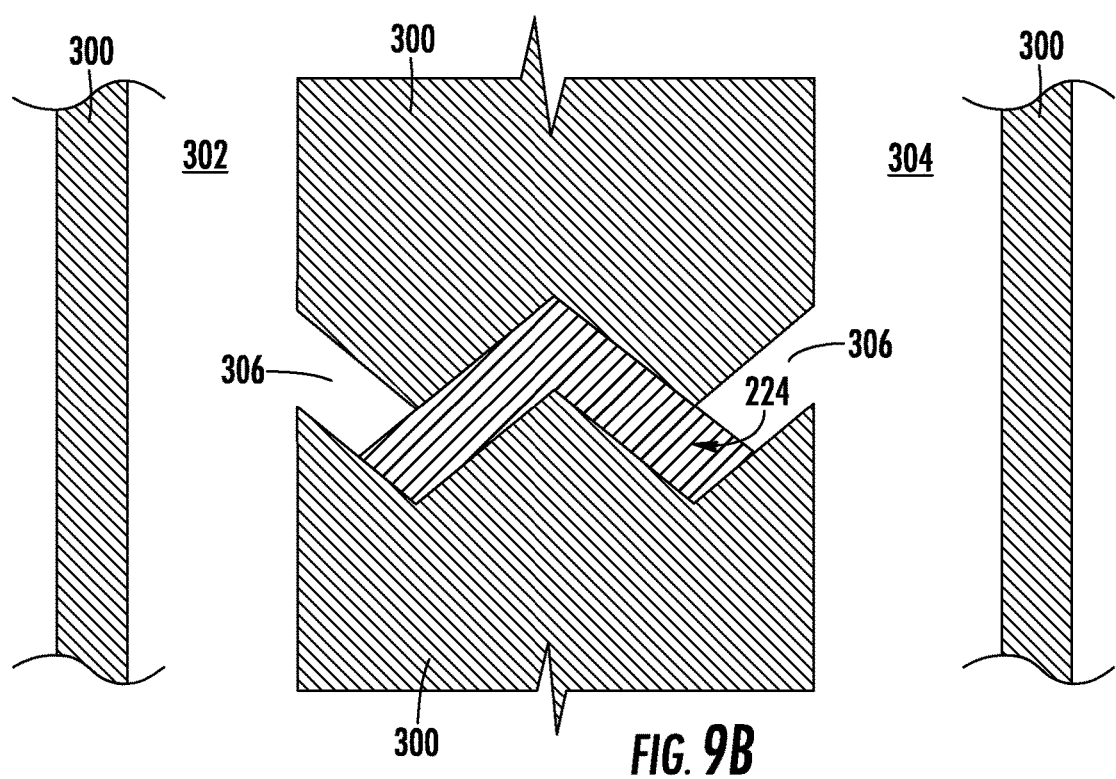
FIG. 9b depicts a cross section of an embodiment of a cast component in which a portion of a tie bar is retained following leaching in accordance with aspects of the present subject matter.

FIG. 9b depicts a cross section of the cast component 300 for FIG. 9a following the leaching of the core 210 and removal from the mold second half 206 in accordance with aspects of the present subject matter. As illustrated in FIG. 9b, a portion of the tie bar 214 remains secured within the linking cavity 306 following the leaching process employed to remove the first leachable core material 226 from the cast component 300. Since the second non-leachable core material portion 224 is not removed from the cast component 300 by leaching, the second non-leachable core material portion 224 is an obstruction to fluid communication through the linking cavity 306.

In general, the exemplary embodiments of a leachable casting core 210 described herein may be manufactured or formed using any suitable process. However, in accordance with several aspects of the present subject matter, the leachable casting core 210 may be formed using an additive-manufacturing process, such as a 3-D printing process. The use of such a process may allow the leachable casting core 210 to be formed integrally, as a single monolithic component, or as any suitable number of sub-components. In particular, the manufacturing process may allow the leachable casting core 210 to be integrally formed and include a variety of features not possible when using prior manufacturing methods. For example, the additive manufacturing methods described herein enable the manufacture of casting cores having unique features, configurations, thicknesses, materials, and orientations not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein for the fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, wax, or any other suitable material. These materials are examples of materials suitable for use in the additive manufacturing processes described herein and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials.

For example, a component may include multiple layers, segments, or parts that are formed using different materials, processes, and/or on different additive manufacturing machines. In this manner, components may be constructed which have different materials and material properties for meeting the demands of any application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Figure 13:
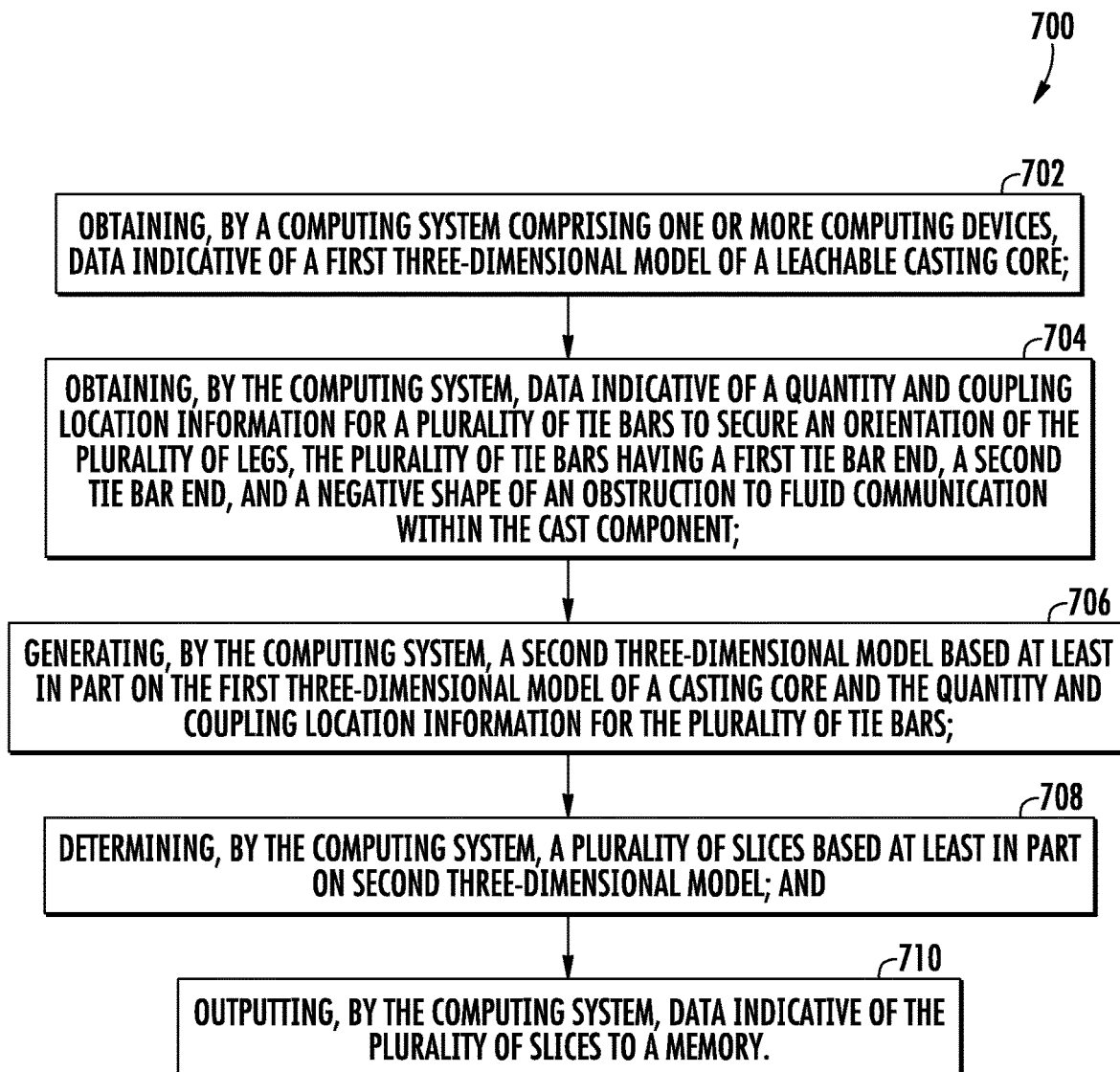
FIG. 13 provides a flow diagram for designing a leachable casting core having a plurality of legs and fluidly-obstructive tie bars is presented.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component as depicted in FIG. 13.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. In addition, the additive manufacturing process enables the manufacture of a single component having different materials such that different portions of the component may exhibit different performance characteristics. The successive, additive nature of the manufacturing process enables the construction of these novel features. As a result, the components described herein may enable more intricate internal cast component shapes.

Figure 11:
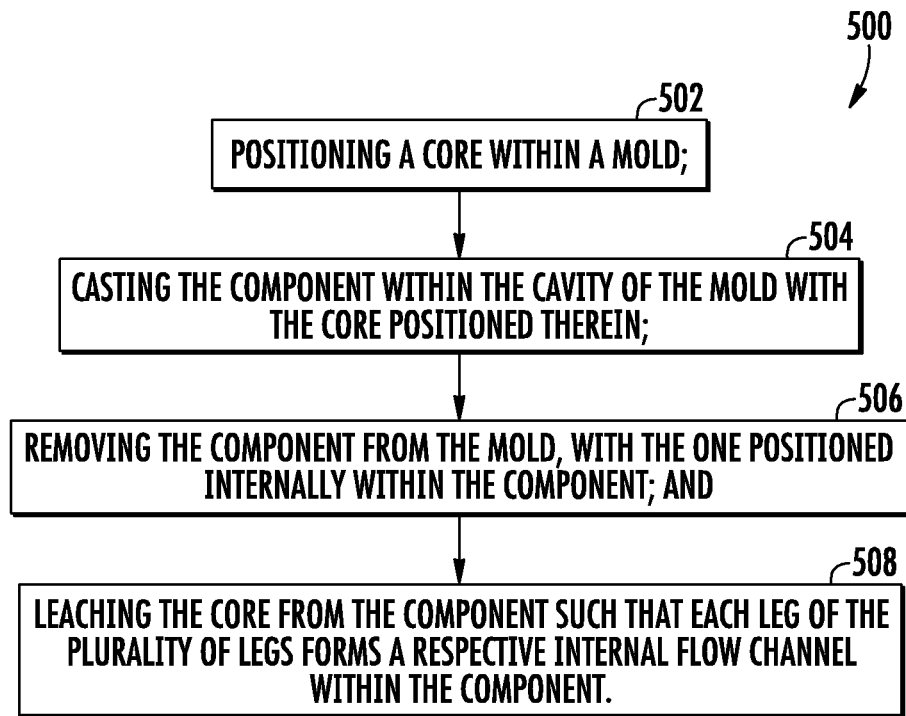
FIG. 11 provides a flow diagram for casting a component having a plurality of internal flow channels.

Referring now to FIG. 11, a flow diagram of a method (500) for casting a component having a plurality of internal flow channels is presented. The exemplary method (500) includes at 502 positioning a core within a mold. For example, the mold may define an outer component shape with the core defining an inner component shape. The core may include a plurality of legs and at least one tie bar that couples at least two of the plurality of legs together. The exemplary method (500) includes at 504, casting the component using the core and the mold. At 506, the exemplary method (500) includes removing the component from the mold. Additionally, the exemplary method (500) includes at 508, leaching the core from the internal component shape. For example, leaching the plurality of legs may form at least a first internal flow channel and a second internal flow channel within the component. Leaching the at least one tie bar may also form a plurality of linking cavities, at least one linking cavity of the plurality of linking cavities having a linking cavity first end and a linking cavity second end. The plurality of linking cavities may obstruct fluid communication through the plurality of linking cavities.

Figure 12:
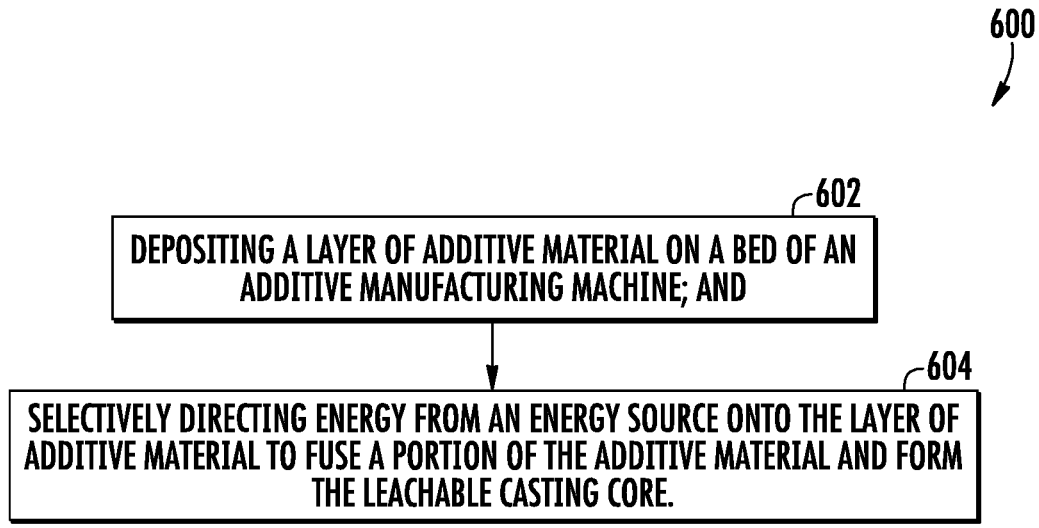
FIG. 12 provides a flow diagram for manufacturing a leachable casting core having a plurality of legs and fluidly-obstructive tie bars.

Referring now to FIG. 12, a flow diagram of a method (600) for manufacturing a leachable casting core having a plurality of legs and fluidly-obstructive tie bars is presented.

The exemplary method (600) includes at 602 depositing a layer of additive material on a bed of an additive manufacturing machine, and at 604, selectively directing energy from an energy source onto the layer of additive material to fuse a portion of the additive material and form the leachable casting core. The leachable casting core of 604 includes a plurality of legs having an outer shape which is a negative of at least a first flow channel and a second flow channel of a cast component, and a plurality of tie bars having a first tie bar end and a second tie bar end. The plurality of tie bars may be coupled to at least two of the plurality of legs, and the plurality of tie bars may have a negative shape of an obstruction to fluid communication within a cast component.

Referring now to FIG. 13, a flow diagram of a method (700) for designing leachable casting cores having a plurality of legs and fluidly-obstructive tie bars is presented. The exemplary method (700) includes at 702, obtaining, by a computing system including one or more computing devices, data indicative of a first three-dimensional model of a leachable casting core. The casting core including a plurality of legs oriented to form at least a first internal flow channel and a second internal flow channel within a cast component. At 704, obtaining, by the computing system, data indicative of a quantity and coupling location information for a plurality of tie bars to secure an orientation of the plurality of legs. The plurality of tie bars includes a first tie bar end, a second tie bar end, and a negative shape of an obstruction to fluid communication within the cast component. Once the number and locations of the legs and tie bars have been determined, the exemplary method (700) includes at 706, generating, by the computing system, a second three-dimensional model based at least in part on the first three-dimensional model of a casting core and the quantity and coupling location information for the plurality of tie bars. The second three-dimensional model is representative of the leachable casting core comprising the plurality of tie bars. The plurality of tie bars secure the orientation of the plurality of legs. At 708, the exemplary method (700) includes determining, by the computing system, a plurality of slices based at least in part on second three-dimensional model. Each slice of the plurality of slices defines a respective cross-sectional layer of the leachable casting core. The exemplary method (700) includes at 710 outputting, by the computing system, data indicative of the plurality of slices to a memory.

Referring again to FIG. 1, in general, the engine 100 may include a core gas turbine engine (indicated generally by reference character 114) and a fan section 116 positioned upstream thereof. The core engine 114 may generally include a substantially tubular outer casing 118 that defines an annular inlet 120. In addition, the outer casing 118 may further enclose and support a booster compressor 122 for increasing the pressure of the air that enters the core engine 114 to a first pressure level. A high pressure, multi-stage, axial-flow compressor 124 may then receive the pressurized air from the booster compressor 122 and further increase the pressure of such air. The pressurized air exiting the high-pressure compressor 124 may then flow to a combustor 126 within which fuel is injected by a fuel system 162 into the flow of pressurized air, with the resulting mixture being combusted within the combustor 126. The high energy combustion products are directed from the combustor 126 along the hot gas path of the engine 100 to a first (high pressure, HP) turbine 128 for driving the high pressure compressor 124 via a first (high pressure, HP) drive shaft 130, and then to a second (low pressure, LP) turbine 132 for driving the booster compressor 122 and fan section 116 via a second (low pressure, LP) drive shaft 134 that is generally coaxial with first drive shaft 130. After driving each of turbines 128 and 132, the combustion products may be expelled from the core engine 114 via an exhaust nozzle 136 to provide propulsive jet thrust.

It should be appreciated that each turbine 128, 130 may generally include one or more turbine stages, with each stage including a turbine nozzle and a downstream turbine rotor. As will be described below, the turbine nozzle may include a plurality of vanes disposed in an annular array about the centerline axis 112 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 130 or 134).

Additionally, as shown in FIG. 1, the fan section 116 of the engine 100 may generally include a rotatable, axial-flow fan rotor 138 that configured to be surrounded by an annular fan casing 140. In particular embodiments, the (LP) drive shaft 134 may be connected directly to the fan rotor 138 such as in a direct-drive configuration. In alternative configurations, the (LP) drive shaft 134 may be connected to the fan rotor 138 via a speed reduction device 137 such as a reduction gear gearbox in an indirect-drive or geared-drive configuration. Such speed reduction devices may be included between any suitable shafts/spools within engine 100 as desired or required.

It should be appreciated by those of ordinary skill in the art that the fan casing 140 may be configured to be supported relative to the core engine 114 by a plurality of substantially radially-extending, circumferentially-spaced outlet guide vanes 142. As such, the fan casing 140 may enclose the fan rotor 138 and its corresponding fan rotor blades 144. Moreover, a downstream section 146 of the fan casing 140 may extend over an outer portion of the core engine 114 so as to define a secondary, or by-pass, airflow conduit 148 that provides additional propulsive jet thrust.

During operation of the engine 100, it should be appreciated that an initial air flow (indicated by arrow 150) may enter the engine 100 through an associated inlet 152 of the fan casing 140. The air flow 150 then passes through the fan blades 144 and splits into a first compressed air flow (indicated by arrow 154) that moves through conduit 148 and a second compressed air flow (indicated by arrow 156) which enters the booster compressor 122. The pressure of the second compressed air flow 156 is then increased and enters the high-pressure compressor 124 (as indicated by arrow 158). After mixing with fuel and being combusted within the combustor 126, the combustion products 160 exit the combustor 126 and flow through the first turbine 128. Thereafter, the combustion products 160 flow through the second turbine 132 and exit the exhaust nozzle 136 to provide thrust for the engine 100.

Figure 10:
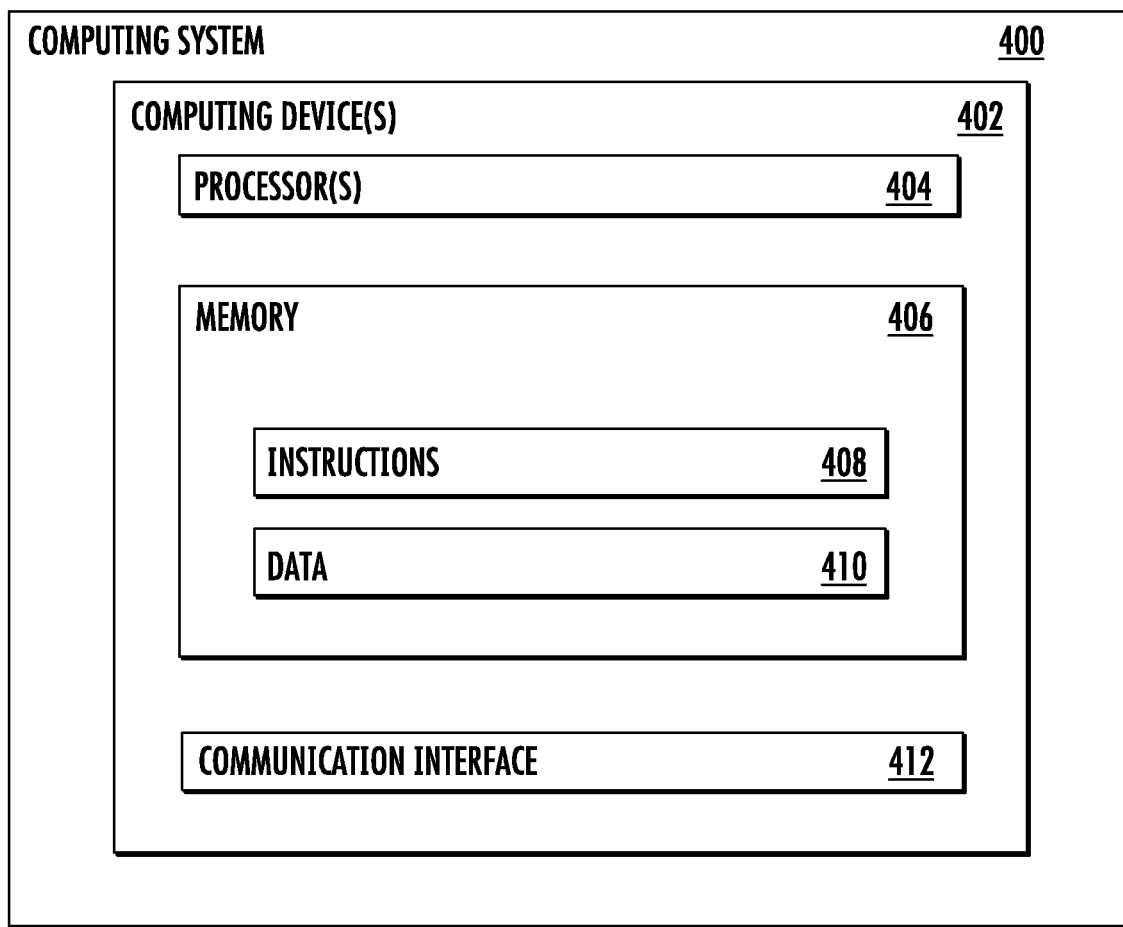
FIG. 10 depicts an exemplary computing device for use in accordance with aspects of the present subject matter.

FIG. 10 provides a block diagram of an example computing system 400 that is representative of an embodiment that may be used to implement the methods and systems described herein according to exemplary embodiments of the present disclosure. As shown, the computing system 400 may include one or more computing device(s) 402. The one or more computing device(s) 402 may include one or more processor(s) 404 and one or more memory device(s) 406. The one or more processor(s) 404 may include any suitable processing device, such as a microprocessor, microcontroller, integrated circuit, logic device, or other suitable processing device. The one or more memory device(s) 406 may include one or more computer-readable media, including, but not limited to, non-transitory computer-readable media, RAM, ROM, hard drives, flash drives, or other memory devices.

The one or more memory device(s) 406 may store information accessible by the one or more processor(s) 404, including computer-readable instructions 408 that may be executed by the one or more processor(s) 404. The instructions 408 may be any set of instructions that when executed by the one or more processor(s) 404, cause the one or more processor(s) 404 to perform operations. The instructions 408 may be software written in any suitable programming language or may be implemented in hardware. In some embodiments, the instructions 408 may be executed by the one or more processor(s) 404 to cause the one or more processor(s) 404 to perform the processes for designing leachable casting cores, the process described in FIG. 13, or for implementing any of the other processes described herein.

The memory device(s) 404 may further store data 410 that may be accessed by the processor(s) 404. For example, the data 410 may include data indicative of the leachable casting core material, the number of legs, the orientation of the legs, the number of tie bars, the tie bar connection points, or the configuration of the tie bars as described herein. The data 410 may include one or more table(s), function(s), algorithm(s), model(s), equation(s), etc. according to example embodiments of the present disclosure.

The one or more computing device(s) 402 may also include a communication interface 412 used to communicate, for example, with the other components of system. The communication interface 412 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. An additive manufactured, leachable casting core comprising:
a plurality of legs configured to establish a plurality of internal flow channels of a cast component; and
a plurality of tie bars having a first tie bar end and a second tie bar end opposite thereof, the plurality of tie bars being coupled to at least two of the plurality of legs, wherein at least one of the plurality of tie bars is oriented to form a linking cavity within the cast component between the internal flow channels, and wherein a configuration of the linking cavity serves as an obstruction to fluid communication through the linking cavity, wherein at least one of:
the plurality of legs further comprises at least two cavity obstructions, the at least two cavity obstructions having an upstream face and a downstream face opposite thereof, and wherein the first tie bar end is in contact with a first downstream face and the second tie bar end is in contact with a second downstream face or second upstream face; or
at least one tie bar of the plurality of tie bars is formed as a coil; or
the casting core is a first material which is susceptible to a leaching process, wherein the casting core further comprises a second core material which is resistant to the leaching process, wherein at least one tie bar of the plurality of tie bars having a second material portion.

2. The casting core of claim 1, wherein the casting core is a ceramic.

3. The casting core of claim 1, wherein the plurality of internal flow channels are a plurality of cooling passages of a component of a gas turbine aviation engine.

4. The casting core of claim 3, wherein the component of the gas turbine aviation engine is a turbine blade.

5. A method of manufacturing a leachable casting core, the method comprising:
depositing a layer of additive material on a bed of an additive manufacturing machine; and
selectively directing energy from an energy source onto the layer of additive material to fuse a portion of the additive material and form the leachable casting core, the leachable casting core comprising:
a plurality of legs having an outer shape which is a negative of at least a first flow channel and a second flow channel of a cast component; and
a plurality of tie bars having a first tie bar end and a second tie bar end, the plurality of tie bars coupled to at least two of the plurality of legs, the plurality of tie bars having a negative shape of an obstruction to fluid communication within a cast component, wherein at least one of:
the plurality of legs define at least two cavity obstructions, the at least two cavity obstructions having an upstream face and a downstream face opposite thereof, and wherein the first tie bar end is in contact with a first downstream face and the second tie bar end is in contact with a second downstream face or a second upstream face; or
at least one tie bar of the plurality of tie bars is formed as a coil; or
the layer of additive material is a first material which is susceptible to a leaching process, the method further comprising embedding a second material within at least one tie bar of the plurality of tie bars, the second material being resistant to the leaching process.

6. The method of claim 5, wherein the plurality of internal flow channels are a plurality of cooling passages of a component of a gas turbine aviation engine.

7. The method of claim 5, wherein the plurality of internal flow channels are a plurality of cooling passages of a turbine blade.

8. The method of claim 5, wherein the casting core is a ceramic.

9. A computer-implemented method for designing leachable casting cores, the method comprising:
- obtaining, by a computing system comprising one or more computing devices, data indicative of a first three-dimensional model of a leachable casting core, wherein the casting core comprises a plurality of legs, the plurality of legs being oriented to form at least a first internal flow channel and a second internal flow channel within a cast component;
- obtaining, by the computing system, data indicative of a quantity and coupling location information for a plurality of tie bars to secure an orientation of the plurality of legs, the plurality of tie bars having a first tie bar end, a second tie bar end, and a negative shape of an obstruction to fluid communication within the cast component, wherein at least one of:
  - the plurality of legs define at least two cavity obstructions, the at least two cavity obstructions having an upstream face and a downstream face opposite thereof, and wherein the first tie bar end is in contact with a first downstream face and the second tie bar end is in contact with a second downstream face or a second upstream face; or
  - at least one tie bar of the plurality of tie bars is formed as a coil; or
  - the layer of additive material is a first material which is susceptible to a leaching process, the method further comprising embedding a second material within at least one tie bar of the plurality of tie bars, the second material being resistant to the leaching process;
- generating, by the computing system, a second three-dimensional model based at least in part on the first three-dimensional model of a casting core and the quantity and coupling location information for the plurality of tie bars, wherein the second three-dimensional model is representative of the leachable casting core comprising the plurality of tie bars, the plurality of tie bars securing the orientation of the plurality of legs;
- determining, by the computing system, a plurality of slices based at least in part on the second three-dimensional model, wherein each slice of the plurality of slices defining a respective cross-sectional layer of the leachable casting core; and
- outputting, by the computing system, data indicative of the plurality of slices to a memory.

10. The method of claim 9, wherein the plurality of internal flow channels are a plurality of cooling passages of a component of a gas turbine aviation engine.

11. The method of claim 10, wherein the component of the gas turbine aviation engine is a turbine blade.

12. The method of claim 9, wherein the casting core is a ceramic.

* * * * *